(12) United States Patent
Steffes et al.

(10) Patent No.: US 6,220,827 B1
(45) Date of Patent: Apr. 24, 2001

(54) ELECTROMOTOR/PUMP ASSEMBLY

(75) Inventors: Helmut Steffes, Hattersheim; Gottfried Dehio, Hanau, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/242,484

(22) PCT Filed: Jul. 25, 1997

(86) PCT No.: PCT/EP97/04043

§ 371 Date: Dec. 2, 1999

§ 102(e) Date: Dec. 2, 1999

(87) PCT Pub. No.: WO98/07985

PCT Pub. Date: Feb. 26, 1998

(30) Foreign Application Priority Data

Aug. 17, 1996 (DE) ............................. 196 33 169

(51) Int. Cl.$^7$ ............................................. F04B 35/00
(52) U.S. Cl. ............................................. 417/360; 464/92
(58) Field of Search ........................ 417/359, 360, 417/423.1, 423.8, 423.14, 423.12; 464/92

(56) References Cited

U.S. PATENT DOCUMENTS

| | | | |
|---|---|---|---|
| 2,139,373 | * 12/1938 | McKinley et al. | 417/423.6 |
| 3,324,798 | * 6/1967 | Freed et al. | 417/360 |
| 3,740,829 | 6/1973 | Yarger. | |
| 3,873,242 | * 3/1975 | Anderson | 417/360 |
| 5,127,316 | 7/1992 | Ishiwata et al. | |
| 5,620,311 | * 4/1997 | Wetzel | 417/360 |

FOREIGN PATENT DOCUMENTS

| | | |
|---|---|---|
| 6 82 865 | 11/1993 | (CH) . |
| 10 07 867 | 5/1957 | (DE) . |
| 12 43 519 | 6/1967 | (DE) . |
| 32 32 083 | 3/1984 | (DE) . |
| 33 31 807 | 3/1984 | (DE) . |
| 39 30 248 | 3/1990 | (DE) . |
| 4134582 | 4/1993 | (DE) . |
| 43 12 687 | 10/1994 | (DE) . |
| 43 15 826 | 11/1994 | (DE) . |
| 44 16 449 | 11/1995 | (DE) . |
| 94 09 587 | 11/1995 | (DE) . |
| 296 06 135 U | 10/1996 | (DE) . |
| 6-074144 | 3/1994 | (JP) . |
| 0 447 790 | 9/1991 | (WO) . |
| 0 621 412 | 10/1994 | (WO) . |
| 96 19031 | 6/1996 | (WO) . |

* cited by examiner

Primary Examiner—Charles G. Freay
(74) Attorney, Agent, or Firm—Rader, Fishman & Grauer PLLC

(57) ABSTRACT

An electric-motor-and-pump assembly includes at least one bearing (7) for a mounting support of a motor shaft (6) in a motor housing (3), and a pump (14), which is adapted to be attached to the motor (2) and has at least one roller bearing (28) for a mounting support of a pump shaft (16) in a pump housing (15). The two shafts (6, 16) are interconnected by way of a force-lockingly operative transmission element (17).

6 Claims, 2 Drawing Sheets

ELECTROMOTOR/PUMP ASSEMBLY

BACKGROUND OF THE IVENTION

The present invention relates to an electric-motor-and-pump assembly including at least one bearing for the mounting support of a motor shaft in a motor housing, and a pump which is adapted to be attached to the motor and has at least one bearing for the mounting support of a pump shaft in a pump housing.

German application DE-OS 32 32 083 discloses a motor-and-pump assembly of this type. Torques are transmitted from the electric motor to the pump assembly by way of a pin shaped on a pump shaft end and engaging into a groove provided on the motor shaft end. The occurring torque is reliably transmitted by this arrangement, however, mounting of the assembly is complicated because the motor and pump can be installed only in a defined position of the shafts in relation to each other. Consequently, it is necessary to precisely maintain the assembly position and to make position checks. Manufacturing tolerances and a clearance provided to facilitate the assembly may provide a certain relief. It has shown, however, that a clearance between the shafts, both in radial and axial directions, produces undesirable noises during operation.

Therefore, an object of the present invention is to provide an electric-motor-and-pump assembly which offers ease of assembly and minimizes noises during operation.

SUMMARY OF THE INVENTION

This object is achieved in that the two shafts are interconnected by way of a force-lockingly operative transmission element.

The force-lockingly operative transmission element further compensates for alignment deviations and angular deviations of the two shafts relative to one another in a particularly favorable fashion without causing the development of undesirable noises.

Further aspects of the present invention can be taken from the description and the drawings.

The present invention will be described in detail in the following by way of embodiments which are shown in the drawings.

DETAILED DESCRIPTION OF THE DRAWINGS

Figure 1:
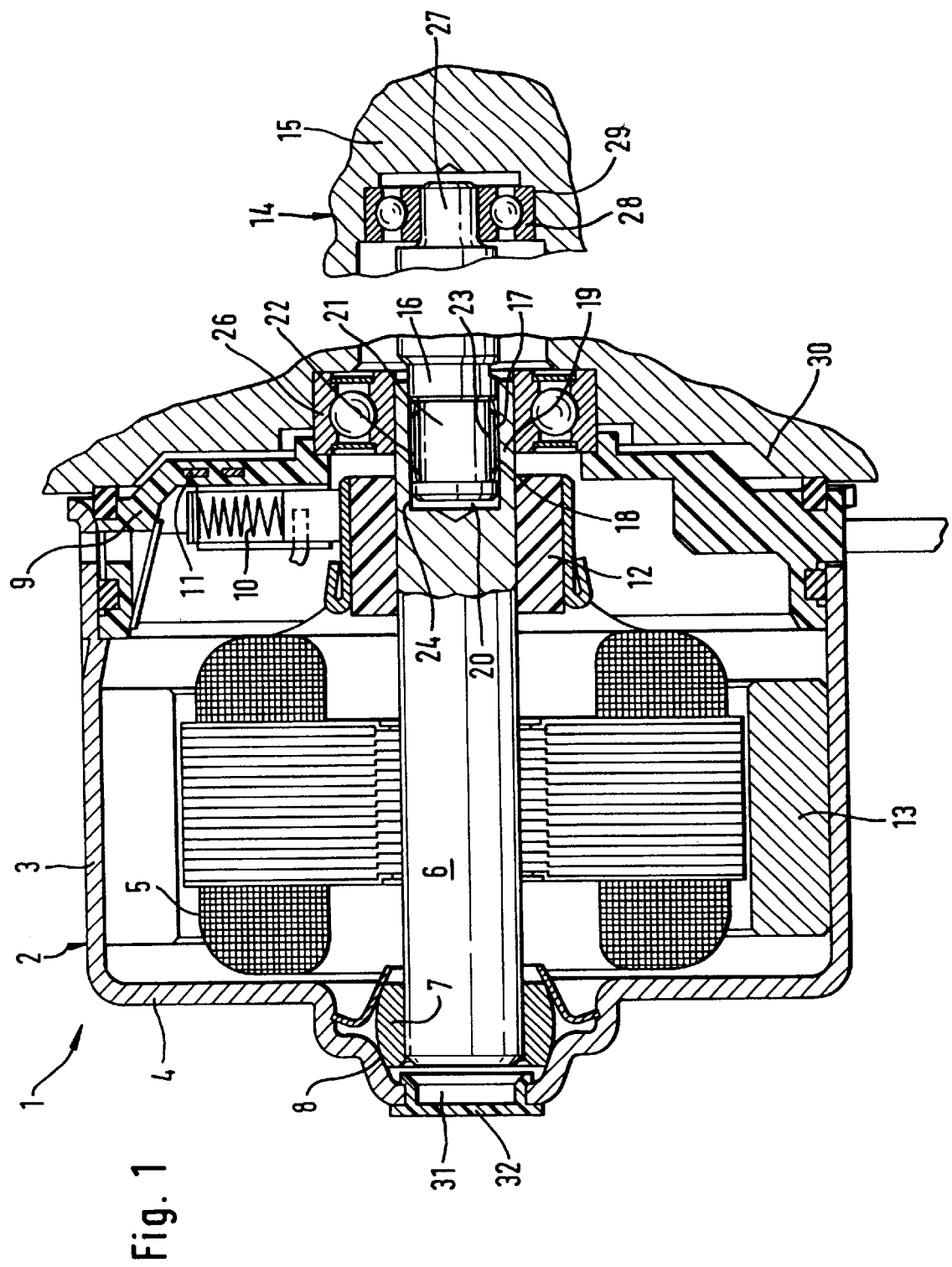
FIG. 1 is a basic cross-sectional view of a first embodiment of a motor-and-pump assembly.

An electric-motor-and-pump assembly 1 according to FIG. 1 includes an electric motor 2 with a cylindrical motor housing 3 which has a bottom 4 and is open on the side facing the pump. In addition, the electric motor 2 has a motor shaft 6 including a rotor 5. On the bottom side, shaft 6 is supported with a bearing 7 on a bowl-shaped bearing seat 8.

On the pump side, the motor housing 3 is closed by way of a bearing plate 9. The bearing plate 9 is slipped into the open side of the motor housing 3 and fastened thereto. Further, the bearing plate 9 is used as a support plate for brushes 10, and conduits 11 to the brushes 10 are possibly embedded into the bearing plate 9 made of plastics. Also, the electric motor 2 includes basically known components such as commutator 12 and magnets 13, the arrangement and mode of operation of which are known and do not require further description.

A pump 14, preferably a piston pump, including a pump housing 15 and a pump shaft 16 is attached to the electric motor 2 on the side of the bearing plate. The pump shaft 16 includes an eccentric which actuates pistons due to shaft rotation. It should be noted that the separate arrangement of the eccentric on the pump shaft, rather than on the motor shaft, has a simplified manufacture of the motor as a result, especially when small eccentricities are concerned.

The two shafts 6, 16 are interconnected by way of a force-lockingly operative transmission element 17. The transmission element 17 has the shape of a sleeve and includes resilient portions 18 which clamp the two shafts 6, 16 in relation to one another. This arrangement provides an non-rotatable connection between the motor shaft 6 and pump shaft 16. The shafts 6, 16 do not perform relative movements during operation. As is shown in the FIG. 1 embodiment, the pump-sided shaft end 19 of the motor shaft 6 includes a blind-end bore 20 into which the pump shaft 16 with its shaft end 21 is inserted along with the transmission element 17. The transmission element 17 closes an interspace 22 between a peripheral surface 23 of the shaft end 21 and the inside surface 24 of the blind-end bore 20 so that there is no more radial play between the two shafts after the assembly is mounted. The transmission element 17 secures the two shafts 6, 16 in position due to force-lock but also in axial relation to each other. Consequently, the bearing 7 in the motor can be configured as a movable bearing and bearing 26 as a fixed-type bearing.

Figure 2:
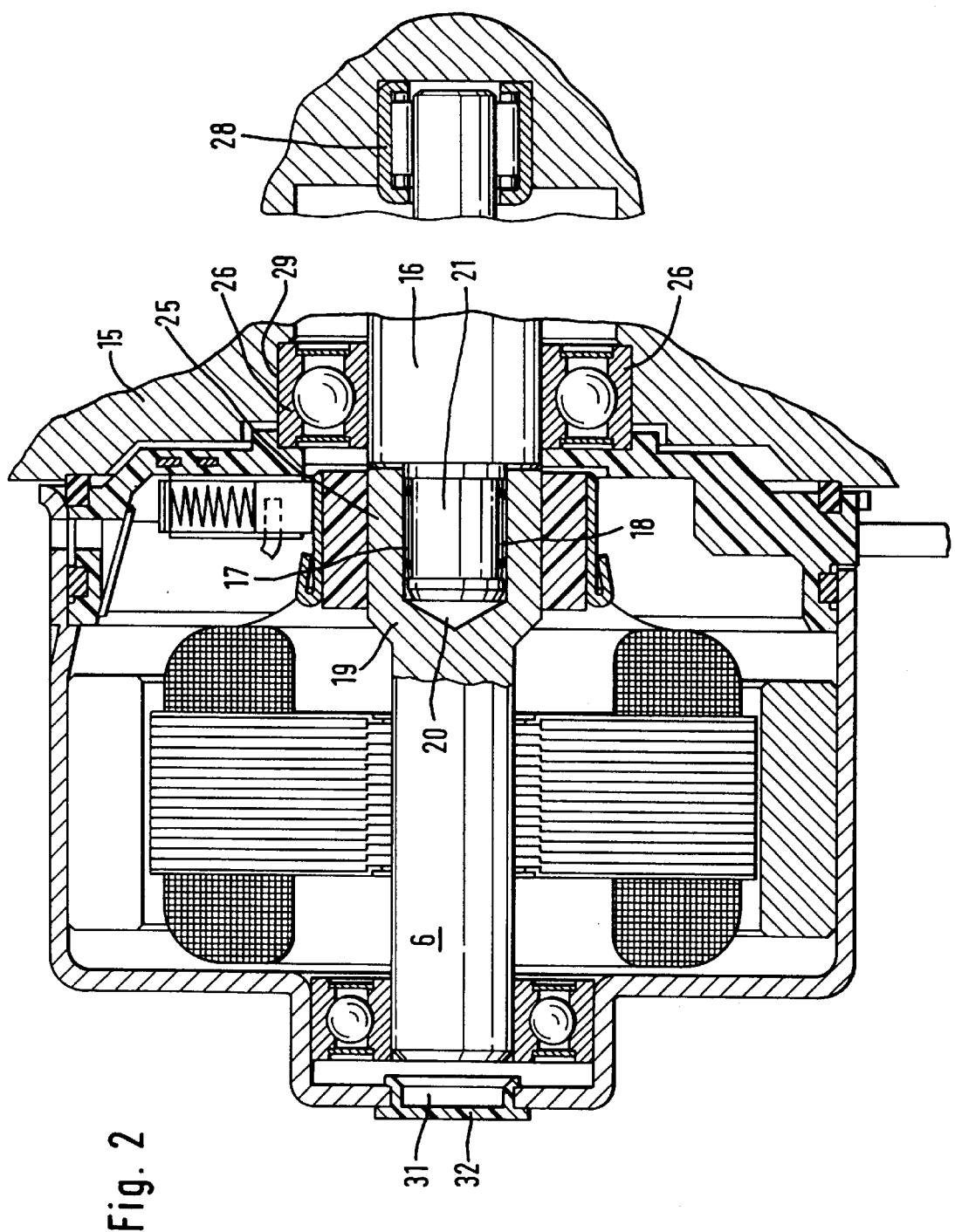
FIG. 2 is a second embodiment in an illustration as in FIG. 1.

An embodiment according to FIG. 2 basically has the same features as described in FIG. 1. In contrast thereto, however, the motor shaft 6 has a cross-sectional expansion 25 proximate the shaft end 19 and a central blind-end bore 20 which serves to accommodate the pump shaft 16 with a shaft end 21. What is also in contrast to FIG. 1 is that the pump shaft 16 is supported by an additional bearing 26 proximate the shaft ends 19, 21. The bearing 26 is supported on the pump housing 15. It is understood that bearing 26, as shown in the embodiment of FIG. 1, may principally be used to support the motor shaft 6 as well. Still further, a needle bearing which necessitates particularly little space is provided as roller bearing 28.

As mentioned before, the transmission element 17 ensures the transmission of torques and, also, can take up additional radial loads. It is force-lockingly operative and compensates for tolerances between the two shafts 6, 16 so that deviations of the two shafts 6, 16 with respect of alignment and angles may also be compensated. Truth of rotation of the two shafts 6, 16 is improved especially by the fact that the two shafts 6, 16 are slipped into one another and supported by way of the bearing 26. Consequently, either the motor shaft has a double mounting support, as is shown in FIG. 1, or the pump shaft has a double mounting support, as is shown in FIG. 2. At its end 27 remote from the electric motor 2, the pump shaft 16 is arranged by way of a roller bearing 28, if necessary, a needle bearing, in the pump housing 15 in both cases. The pump housing 15 includes corresponding bearing seats 29 for the bearing 26 and the roller bearing 28.

For the assembly of the electric-motor-and-pump assembly, the two shafts 6, 16 are slipped onto one another, and the bearing plate 9 of the electric motor 2 extends at least in part into a mating indentation 30 of the pump housing 5. For further simplification of the assembly, a recess 31 is provided on the dome-shaped bearing seat 8 on the bottom 4 of the motor housing 3. The purpose of recess 31 is to apply the necessary mounting force by means of a mounting tool to the motor shaft 6. The recess 31 is closed by means of a plug 32 after the assembly has been mounted. Further, it is possible to secure the two shafts 6, 16 additionally in position by way of a form-locking transmission element, for example, a pin or bolt. This is done in that the pin is slipped through corresponding transverse bores in the shaft ends 19, 21.

What is claimed is:

1. An electric-motor-and-pump assembly including a motor, a pump, a motor shaft, a pump shaft, at least one bearing for a mounting support of the motor shaft in a motor housing, the pump being adapted to be attached to the electric motor and having at least one roller bearing for a mounting support of the pump shaft in a pump housing, the two shafts being connected to one another by way of a force-lockingly operative transmission element including resilient portions securing the two shafts in relation to one another.

2. An assembly as claimed in claim 1, wherein the motor shaft and the pump shaft are connected to the transmission element without a clearance.

3. An assembly as claimed in claim 1, wherein the transmission element is arranged on a shaft end of the pump shaft and adapted to be inserted into a blind-end bore of the motor shaft.

4. An assembly as claimed in claim 1, wherein at least one of the shafts has an end, proximate which an additional bearing is provided as a mounting support for the shaft.

5. An assembly as claimed in claim 1, wherein the motor shaft has an end, proximate which a cross-sectional expansion and a central blind-end bore are provided to accommodate the pump shaft.

6. An assembly as claimed in claim 1, wherein the motor housing has a recess which is in alignment with the motor shaft.

* * * * *